United States Patent
Furukawa et al.

(10) Patent No.: US 8,199,142 B2
(45) Date of Patent: Jun. 12, 2012

(54) LIQUID CRYSTAL DISPLAY DEVICE AND CONTROL METHOD THEREOF THAT DRIVES IMAGE DATA BASED ON DETECTED TEMPERATURE AND INTENSITY OF EXTERNAL LIGHT

(75) Inventors: Tomoo Furukawa, Osaka (JP); Kazuyoshi Fujioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 168 days.

(21) Appl. No.: 12/734,355

(22) PCT Filed: Jul. 11, 2008

(86) PCT No.: PCT/JP2008/062630
§ 371 (c)(1),
(2), (4) Date: Apr. 27, 2010

(87) PCT Pub. No.: WO2009/069337
PCT Pub. Date: Jun. 4, 2009

(65) Prior Publication Data
US 2010/0253675 A1    Oct. 7, 2010

(30) Foreign Application Priority Data
Nov. 26, 2007   (JP) ................. 2007-305124

(51) Int. Cl.
*G06F 3/038* (2006.01)
*G09G 5/10* (2006.01)
(52) U.S. Cl. ........ 345/212; 345/204; 345/207; 345/211; 345/690
(58) Field of Classification Search .......... None
See application file for complete search history.

(56) References Cited

U.S. PATENT DOCUMENTS

| 6,049,288 A | 4/2000 | Kawasaki |
| 2005/0078081 A1 | 4/2005 | Oda et al. |
| 2008/0204481 A1* | 8/2008 | Mostinski ............ 345/690 |

(Continued)

FOREIGN PATENT DOCUMENTS

JP        2004-272050        9/2004

(Continued)

OTHER PUBLICATIONS

International Search Report.

(Continued)

*Primary Examiner* — Bipin Shalwala
*Assistant Examiner* — Ryan A Lubit
(74) *Attorney, Agent, or Firm* — Harness, Dickey & Pierce, P.L.C.

(57) ABSTRACT

A liquid crystal display device includes: an emphasis conversion section performing an emphasis conversion process on image data of a current frame, based on an emphasis conversion parameter corresponding to a combination of image data of the current frame and image data of a frame immediately preceding the current frame; driving sections causing a liquid crystal display panel to display an image corresponding to the image data on which the emphasis conversion process has been performed; a temperature sensor detecting an in-device temperature of the device; an optical sensor detecting a light intensity of incident external light into the panel; and a control section calculating a temperature of the panel, based on the in-device temperature and the light intensity, and changing the emphasis conversion parameter to be used in the emphasis conversion process in accordance with the calculated temperature of the liquid crystal panel.

7 Claims, 6 Drawing Sheets

U.S. PATENT DOCUMENTS

2009/0081813 A1* 3/2009 Granados et al. .............. 438/7
2009/0201228 A1* 8/2009 Kim et al. .................... 345/60
2010/0188443 A1* 7/2010 Lewis et al. ................. 345/690

FOREIGN PATENT DOCUMENTS

| JP | 2004-317623 | 11/2004 |
| JP | 2007-219392 | 8/2007 |
| JP | 2007-279618 | 10/2007 |
| WO | WO 2007/097299 | 8/2007 |

OTHER PUBLICATIONS

"Special AMLCD Configurations", "Active Matrix Liquid Crystal Displays: Fundamentals and Applications", 2005 Newness, U.S.A. XP002667405, pp. 179-196.

* cited by examiner

| | PANEL TEMPERATURE TP |
|---|---|
| OS TABLE MEMORY 1 d | EQUAL TO OR MORE THAN 33°C |
| OS TABLE MEMORY 1 c | EQUAL TO OR MORE THAN 23°C AND LESS THAN 33°C |
| OS TABLE MEMORY 1 b | EQUAL TO OR MORE THAN 13°C AND LESS THAN 23°C |
| OS TABLE MEMORY 1 a | LESS THAN 13°C |

LIQUID CRYSTAL DISPLAY DEVICE AND CONTROL METHOD THEREOF THAT DRIVES IMAGE DATA BASED ON DETECTED TEMPERATURE AND INTENSITY OF EXTERNAL LIGHT

TECHNICAL FIELD

The present invention relates to a liquid crystal display device. More specifically, the present invention relates to a technique for improving optical response characteristics of a liquid crystal display panel by performing an emphasis conversion process on input image data.

BACKGROUND ART

Recently, display devices are required to have reduced weight and thickness as personal computers and television receivers decrease in weight and thickness. In response to such requirements, flat-panel display devices such as liquid crystal displays (LCDs) are becoming more common in place of cathode-ray tube (CRT) displays.

These days, LCDs are widely used not only as display devices for computers but also as display devices for television receivers. As such, there are growing needs for displaying moving images on LCDs. However, LCDs generally have a response speed that is lower than a response speed of display devices such as CRTs. On this account, in general, LCDs have a disadvantage such that it is difficult to appropriately display moving images.

In order to solve the problem of the response speed of LCDs, there is a known method for driving liquid crystals by applying, to a liquid crystal layer, a driving voltage (overshoot driving voltage) that is higher than a predetermined gray scale voltage of an input image signal of a current frame or a driving voltage (undershoot driving voltage) that is lower than the predetermined gray scale voltage, according to a combination of the input image signal of the current frame and an input image signal of a frame immediately preceding (i.e., one vertical display period before) the current frame. Furthermore, as a method obtained by developing this driving method, there is another known method for driving liquid crystals by applying, to a liquid crystal layer, a driving voltage that is higher or lower than a predetermined gray scale voltage of an input image signal of a current frame, according to a combination of the input image signal of the current frame and an image signal corresponding to a gray scale (an image) that is assumed to be actually displayed on the liquid crystal display in a frame immediately preceding the current frame (i.e., an image signal that causes the assumed gray scale to be displayed on the liquid crystal display, when the image signal is applied until the liquid crystals are aligned in a steady state). Hereinafter in the present specification, these methods for driving liquid crystals are referred to as an overshoot drive (OS drive) or an emphasis conversion process.

It is also known that the response speed of liquid crystal is highly dependent on temperature. For the purpose of eliminating this temperature dependency of the response speed of liquid crystal, there is known a technique, i.e., a liquid crystal display device described below. The liquid crystal display device includes a plurality of tables each storing an emphasis conversion parameter corresponding to a combination of image data of a current frame and an image signal of a frame immediately preceding the current frame (or an image signal corresponding to a gray scale that is assumed to be actually displayed on the liquid crystal display in the frame immediately preceding the current frame). The tables are provided so as to correspond respectively to a plurality of temperature ranges. In accordance with a result of temperature detection by a temperature sensor which is provided in the liquid crystal display device, one table is selected from the plurality of tables. With use of the selected table, an overshoot drive is performed.

As an example, Patent Literature 1 discloses a liquid crystal display device including: a plurality of OS look-up tables corresponding respectively to a plurality of temperature ranges, each of the plurality of OS look-up tables storing in advance an emphasis conversion parameter corresponding to a combination of image data of a current frame and image data of a frame immediately preceding the current frame; a temperature sensor detecting an in-device temperature of the liquid crystal display device; an installation configuration detecting section detecting an installation configuration of the device; a control CPU selecting, by switching, any of the plurality of OS look-up tables based on temperature data detected by the temperature sensor and installation configuration data detected by the installation configuration detecting section; and an emphasis conversion section obtaining, in reference to an OS look-up table selected by switching, emphasis conversion data that corrects optical response characteristics of a liquid crystal display panel.

As another example, Patent Literature 2 discloses a liquid crystal display device that corrects optical response characteristics of a liquid crystal display panel by performing, based on an emphasis conversion parameter obtained as a result of a comparison between image data of a current frame and image data of a frame immediately preceding the current frame, an emphasis conversion on image data which is to be supplied to the liquid crystal display panel. This liquid crystal display device includes: temperature detection means detecting an in-device temperature of the liquid crystal display device; and control means correcting temperature data detected by the temperature detection means so as to compensate a difference between the detected temperature data and the temperature of the liquid crystal display panel, and, based on thus corrected temperature data, variably controlling the emphasis conversion parameter. More specifically, the control means includes an operation expression storage section storing operation expressions for, e.g., adding to/subtracting from the temperature data detected by the temperature sensor, a predetermined value which is determined in advance in accordance with, for example, a mounting position of the temperature sensor (a relative positional relation of the temperature sensor with respect to the liquid crystal display panel); and a computing section performing, with use of an operation expression read out from the operation expression storage section, a correction operation on the temperature data detected by the temperature sensor. The technique disclosed in Patent Literature 2 thus compensates a difference between the temperature detected by the temperature sensor and an actual temperature of the liquid crystal display panel. The difference arises from restriction of the mounting position of the temperature sensor.

CITATION LIST

Patent Literature 1
Japanese Patent Application Publication, Tokukai, No. 2004-272050 A (Published on Sep. 30, 2004)
Patent Literature 2
Japanese Patent Application Publication, Tokukai, No. 2004-317623 A (Published on Nov. 11, 2004)

SUMMARY OF INVENTION

In the above-described conventional techniques, however, it is difficult to provide a temperature sensor in a liquid crystal display panel. On this account, a temperature sensor is provided in a member other than a liquid crystal display panel. In consequence, when a temperature of the liquid crystal display panel rises due to incident external light into the liquid crystal display panel, a discrepancy occurs between a result of the temperature detection by the temperature sensor and an actual temperature of the liquid crystal display panel. This causes a problem such that optical response characteristics of the liquid crystal display panel cannot be appropriately corrected.

FIG. 9 is a graph showing an exemplary result of an experiment for examining, in a case where external light was entered into a liquid crystal display panel, a relation between an elapsed time and a temperature change of the liquid crystal display panel from a point at which the external light started to enter. Note that this experiment was conducted by the inventors of the present invention for the purpose of explaining the above-mentioned problem on which those skilled in the art had not conventionally focused attention. For this reason, the experiment and the result thereof shown in FIG. 9 are not publicly known.

In this experiment, a display surface of a liquid crystal display panel was illuminated by light from a light source in an environment at a temperature of approximately 25° C. so as to examine, with use of a contact thermometer, a relation between an elapsed time and a temperature change of the liquid crystal display panel from a start of the illumination. The experiment was carried out for examining two different cases in one of which an illuminance of the light from the light source was 10,000 1× and in the other one of which the illuminance was 20,000 1×.

As shown in FIG. 9, the temperature of the liquid crystal display panel rises in accordance with the elapsed time from the start of the illumination. Furthermore, the higher a light intensity (illuminance) becomes, the higher a level of the temperature rise becomes. Five minutes after the start of the illumination, the temperature of the liquid crystal panel climbed up to approximately 45° C. in the case where the illuminance was 10,000 1×, and the temperature of the liquid crystal panel climbed up to approximately 65° C. in the case where the illuminance was 20,000 1×.

Meanwhile, in the conventional techniques as described above, a temperature sensor was required to be attached to a member other than the liquid crystal display panel, for example, a circuit substrate, because it was difficult to provide the temperature sensor in the liquid crystal display panel. On this account, when the temperature of the liquid crystal display panel changed due to incident external light, a significant difference occurred between a temperature detected by the temperature sensor and the actual temperature of the liquid crystal display panel. This made it impossible to appropriately correct the optical response characteristics of the liquid crystal display panel.

In the technique disclosed in the aforementioned Patent Literature 2, a predetermined value corresponding to, e.g., a mounting position of the temperature sensor is added to/subtracted from the temperature data detected by the temperature sensor. This is intended to compensate a difference between the temperature detected by the temperature sensor and the actual temperature of the liquid crystal display panel. The difference here arises due to restriction of the mounting position of the temperature sensor. However, in this technique, no consideration is given to an increase in temperature of the liquid crystal display panel due to the incident external light.

The present invention is attained in view of the aforementioned problems, and an object of the present invention is to provide a liquid crystal display device that is capable of appropriately correcting optical response characteristics of a liquid crystal display panel even in a case where a temperature of the liquid crystal display panel changes due to incident external light into the liquid crystal display panel, and a control method of the liquid crystal display device.

In order to attain the foregoing object, a liquid crystal display device according to the present invention is a liquid crystal display device which includes: an emphasis conversion section performing an emphasis conversion process on image data of a current frame, based on an emphasis conversion parameter corresponding to a combination of image data of the current frame and image data of a frame immediately preceding the current frame or image data corresponding to an image assumed to be actually displayed on a liquid crystal display panel in the frame immediately preceding the current frame; driving sections causing the liquid crystal display panel to display an image corresponding to the image data on which the emphasis conversion process has been performed by the emphasis conversion section; a temperature detection section detecting an in-device temperature of the liquid crystal display device; a light intensity detection section detecting a light intensity of incident external light into the liquid crystal display panel; a panel temperature calculation section calculating a temperature of the liquid crystal display panel, based on the in-device temperature detected by the temperature detection section and the light intensity of the incident external light detected by the light intensity detection section; and a control section changing the emphasis conversion parameter to be used in the emphasis conversion process in accordance with the temperature of the liquid crystal panel calculated by the panel temperature calculation section.

With the above-described arrangement, the temperature detection section detects the in-device temperature; the light intensity detection section detects the light intensity of the incident external light into the liquid crystal display panel; and the panel temperature calculation section calculates the temperature of the liquid crystal display panel based on the in-device temperature detected by the temperature detection section and the light intensity detected by the light intensity detection section. Then, in accordance with the temperature of the liquid crystal display panel calculated by the panel temperature calculation section, the control section changes the emphasis conversion parameter to be used in the emphasis conversion process. Consequently, it is possible to perform the emphasis conversion process based on an actual temperature (or a temperature close to the actual temperature) of the liquid crystal display panel even in a case where the temperature of the liquid crystal display changes due to the incident external light into the liquid crystal display panel. As such, it is possible to appropriately correct the optical response characteristics of the liquid crystal display panel.

The liquid crystal display device may be configured so as to include: a plurality of look-up tables respectively corresponding to a plurality of temperature ranges of the liquid crystal display panel, each of the plurality of look-up table storing the emphasis conversion parameter corresponding to the combination of the image data of the current frame and the image data of the frame immediately preceding the current frame or the image data corresponding to the image assumed to be actually displayed on the liquid crystal display panel in the frame immediately preceding the current frame, the control section causing the emphasis conversion section to perform the emphasis conversion process, based on a look-up table from among the plurality of look-up tables, the look-up table corresponding to the temperature of the liquid crystal display panel calculated by the panel temperature calculation section.

With this arrangement, it is possible to perform the emphasis conversion process according to a look-up table selected in accordance with the temperature of the liquid crystal panel calculated by the panel temperature calculation section. This makes it possible to appropriately correct the optical response characteristics of the liquid crystal display panel.

The light intensity detection section may be provided in the liquid crystal display panel. With this arrangement, it is possible to detect the amount of the incident light into the crystal display panel more accurately, because the light intensity detection section is provided in the liquid crystal display panel.

The liquid crystal display panel may be a liquid crystal display panel including pixels each including: a transmissive region performing display by transmitting, through the pixel, light emitted from a backlight; and a reflective region performing display by reflecting incident external light.

The liquid crystal display device having a transmissive region and a reflective region is manufactured on the supposition that the liquid crystal display device is used in an environment where incident external light has a high light intensity. As such, during use, the temperature of the liquid crystal display panel is greatly changed by the incident external light into the liquid crystal display panel. With the above-described arrangement, it is possible to perform the emphasis conversion process based on the actual temperature (or a temperature close to the actual temperature) of the liquid crystal display panel. Therefore, the optical response characteristics of the liquid crystal display panel can be appropriately corrected.

The light intensity detection section may be provided so as to overlap the reflective region when seen from a normal direction of a display surface.

Generally, in a liquid crystal display device having a transmissive region and a reflective region, a decrease in transmissivity in a transmissive region has a greater influence on a display quality than a decrease in reflectance in a reflective region. With the above-described arrangement, the light intensity detection section is provided so as to overlap the reflective region when seen from a normal direction of the display surface. That is, the light intensity detection section causes no decrease in the transmissivity in the transmissive region. Thus, it is possible to curb deterioration of the display quality.

The liquid crystal display device may be configured such that the panel temperature calculation section calculates the temperature of the liquid crystal display panel every predetermined period; the light intensity detection section detects an average light intensity value or a total light amount value of incident light into the liquid crystal display panel in a period from a time point at which the panel temperature calculation section last calculates the temperature of the liquid crystal display panel to a present time; the panel temperature calculation section calculates: an amount of heat input into the liquid crystal display panel due to the incident light in a period from a time point at which the panel temperature calculation section last calculates the temperature of the liquid crystal display panel to a present time, based on a detection result of the average light intensity value or the total light amount value; an amount of heat dissipation from the liquid crystal display panel to an outside in the period from the time point at which the panel temperature calculation section last calculates the temperature of the liquid crystal display panel to the present time, based on a detection result of the in-device temperature detected by the temperature detection section and a last calculation result of the temperature of the liquid crystal display panel; and a current temperature of the liquid crystal display panel based on the amount of heat input, the amount of heat dissipation, and the last detection result of the temperature of the liquid crystal display panel.

With this arrangement, the panel temperature calculation section calculates: (i) an amount of heat input into the liquid crystal display panel due to incident light in a period from a time point at which the panel temperature calculation section last calculates the temperature of the liquid crystal display panel to a present time; (ii) an amount of heat dissipation from the liquid crystal panel to the outside in the period from the time point at which the panel temperature calculation section last calculates the temperature of the liquid crystal display panel to the present time. Then, based on the aforementioned (i) the amount of heat input, (ii) the amount of heat dissipation, and (iii) a last detection result of the temperature of the liquid crystal display panel, the panel temperature calculation section calculates a current temperature of the liquid crystal display panel. This makes it possible to appropriately calculate the temperature of the liquid crystal panel. In consequence, it is possible to appropriately correct the optical response characteristics of the liquid crystal display panel even in a case where the temperature of the liquid crystal display panel changes due to the incident external light into the liquid crystal display panel.

In order to attain the aforementioned object, a method for controlling a liquid crystal display device according to the present invention is a method for controlling a liquid crystal display device in which the liquid crystal display device performs an emphasis conversion process on image data of a current frame, based on an emphasis conversion parameter corresponding to a combination of image data of the current frame and image data of a frame immediately preceding the current frame or image data corresponding to an image assumed to be actually displayed on a liquid crystal display panel in the frame immediately preceding the current frame, and causing the liquid crystal display panel to display an image corresponding to the image data on which the emphasis conversion process has been performed, and the method according to the present invention includes the steps of: detecting an in-device temperature of the liquid crystal display device; detecting a light intensity of incident external light into the liquid crystal display panel; calculating a temperature of the liquid crystal display panel, based on the in-device temperature detected in the step of detecting the in-device temperature and the light intensity of the incident external light detected in the step of detecting the light intensity; and changing the emphasis conversion parameter to be used in the emphasis conversion process, in accordance with the temperature of the liquid crystal display panel calculated in the step of calculating the temperature of the liquid crystal panel.

According to the above-described method, the in-device temperature is detected in the step of detecting the in-device temperature; the light intensity of incident external light into the liquid crystal display panel is detected in the step of detecting the light intensity; and, based on the in-device temperature detected in the step of detecting the in-device temperature and the light intensity of the incident external light detected in the step of detecting the light intensity, the temperature of the liquid crystal display panel is calculated in the step of calculating the temperature of the liquid crystal panel. Then, in the step of changing the emphasis conversion parameter, the emphasis conversion parameter to be used in the emphasis conversion process is changed in accordance with the temperature of the liquid crystal display panel calculated in the step of calculating the temperature of the liquid crystal panel. Therefore, it is possible to perform the emphasis conversion process based on the actual temperature (or a temperature close to the actual temperature) of the liquid crystal display panel even in a case where the temperature of the liquid crystal display panel changes due to the incident external light into the liquid crystal display panel. Thus, the optical characteristics of the liquid crystal display panel can be appropriately corrected.

REFERENCE SIGNS LIST

1 Liquid Crystal Display Device
1a to 1d OS Table Memories (Look-up Tables)
2 Emphasis Conversion Section
3 Liquid Crystal Controller (Driving Section)
4 Liquid Crystal Display Panel
5 Gate Driver (Driving Section)
6 Source Driver (Driving Section)
7 Temperature Sensor (Temperature Detection Section)
8 Control Section
9 Optical Sensor (Light Intensity Detection Section)
21 TFT Substrate
22 Counter Substrate
23 Transparent Electrode
24 Reflective Electrode
31 In-Device Temperature Calculation Section
32 Incident Light Intensity Calculation Section
33 Panel Temperature Calculation Section
34 Threshold Value Discrimination Section
35 Control Signal Output Section
41 Calculated Temperature Storage Section

DESCRIPTION OF EMBODIMENTS

Figure 1:
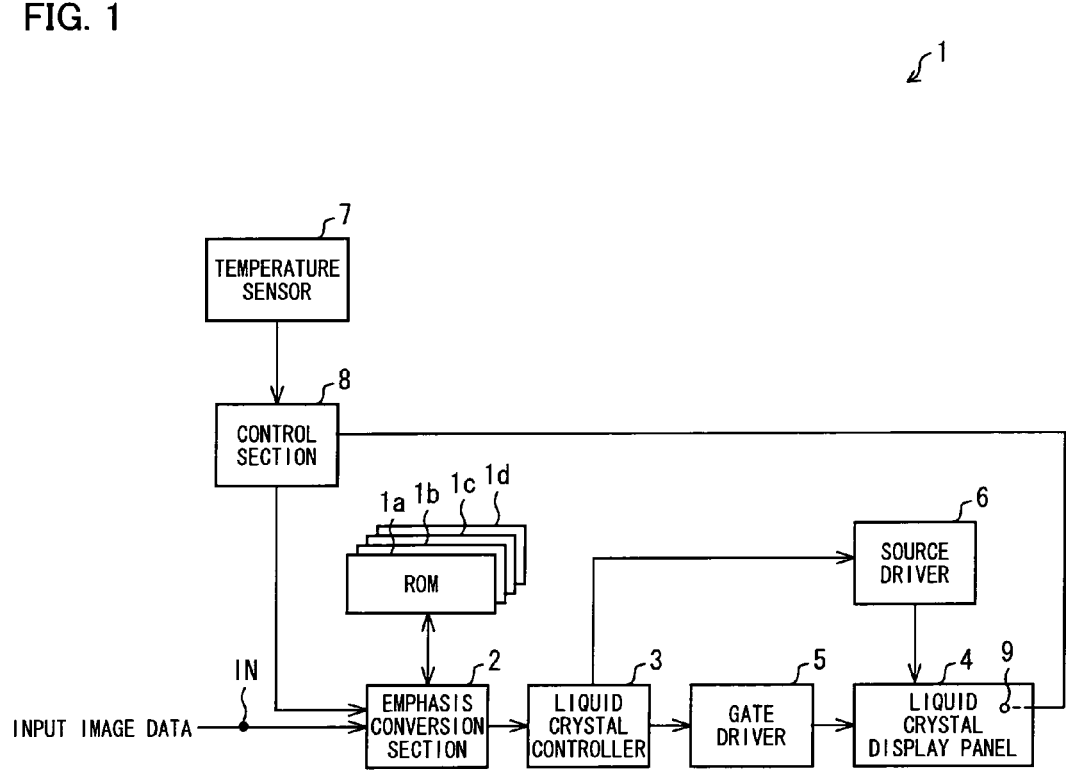
FIG. 1 is a block diagram schematically illustrating a configuration of a liquid crystal display device according to an embodiment of the present invention.

The following explains an embodiment of the present invention. FIG. 1 is a block diagram schematically illustrating a configuration of a liquid crystal display device 1 according to the present embodiment. This liquid crystal display device 1 is to be provided in a cellular phone, and includes a transmissive region and a reflective region. In the transmissive region, display is performed by transmitting light from a backlight through each pixel, while in the reflective region, display is performed by reflecting incident external light.

As illustrated in FIG. 1, the liquid crystal display device 1 includes OS table memories (ROMs, look-up tables) 1a to 1d, an emphasis conversion section 2, a liquid crystal controller 3, a liquid crystal display panel 4, a gate driver 5, a source driver 6, a temperature sensor 7, and a control section 8. The liquid crystal display panel 4 includes an optical sensor 9 that detects a light intensity of incident external light that enters the liquid crystal display panel 4.

Figure 2:
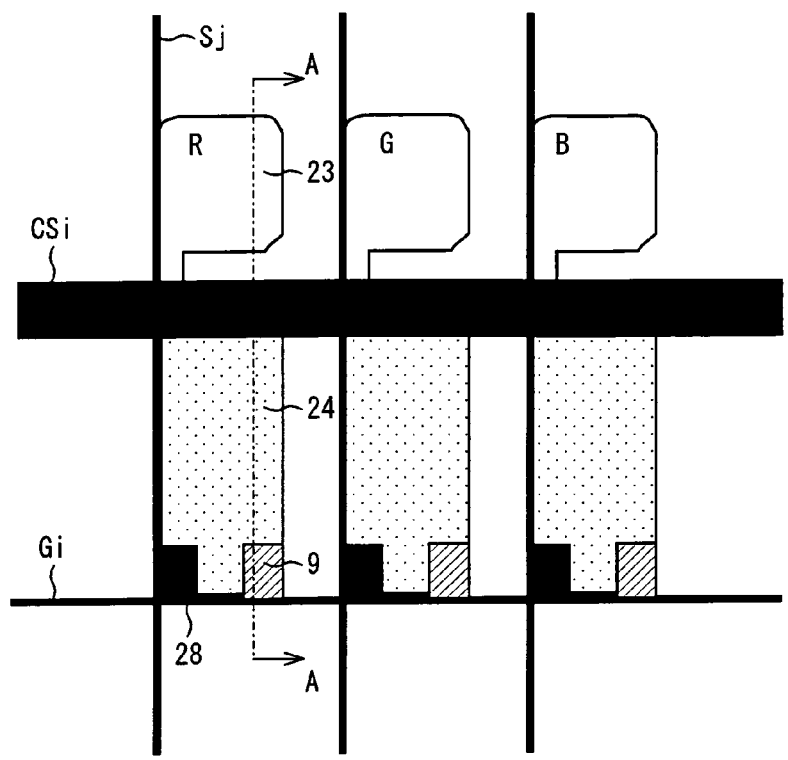
FIG. 2 is a plane view illustrating a pixel configuration in a liquid crystal display panel included in the liquid crystal display device of FIG. 1.
Figure 3:
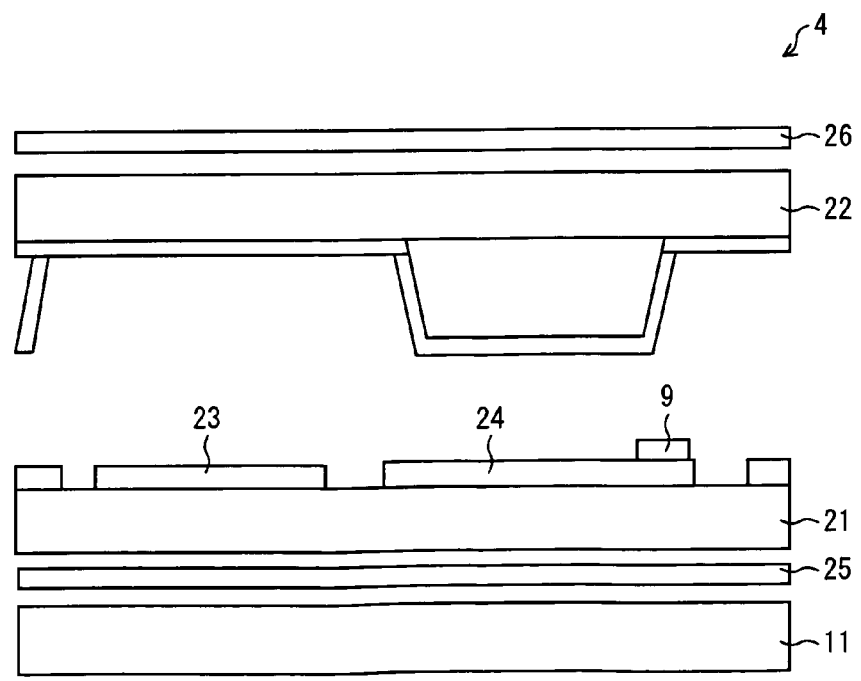
FIG. 3 is a sectional view of the liquid crystal display device taken along the line A-A in the plane view of FIG. 2.

FIG. 2 is a plane view illustrating a picture element (subpixel) configuration in the liquid crystal display panel 4. FIG. 3 is a cross sectional view of the liquid crystal display panel 4 taken along the line A-A of FIG. 2.

As illustrated in FIG. 2, the liquid crystal display panel 4 includes a plurality of scanning lines Gi (i is an integer of two or more) disposed substantially in parallel to each other, a plurality of data lines Sj (j is an integer of two or more) disposed substantially orthogonal to the scanning lines Gi, and common lines CSi disposed substantially in parallel to the scanning lines Gi. At each intersection of the scanning lines Gi and the data lines Sj, a pixel made up of picture elements (subpixels) of R, G, and B is provided.

As illustrated in FIG. 3, the liquid crystal display panel 4 includes a TFT substrate 21 and a counter substrate 22 which are disposed to face each other, a transparent electrode 23 and a reflective electrode 24 which are provided on a surface of the TFT substrate 21 on a side of the counter substrate 22, a polarizing plate 25 provided on the other surface of the TFT substrate 21 which is opposite to the surface facing the counter substrate 22, and a polarizing plate 26 provided on a surface of the counter substrate 22 which is opposite to the other surface facing the TFT substrate 21. On the reflective electrode 24 disposed on the TFT substrate 21, an optical sensor 9 is provided. As illustrated in FIG. 2, the optical sensor 9 is provided so as to overlap the reflective electrode 24 when seen from a normal direction of the display surface. Generally, in a liquid crystal display device having a transmissive region and a reflective region in each pixel, a decrease in transmissivity in a transmissive region has a greater effect on a display quality than a decrease in reflectance in a reflective region. When the optical sensor 9 is provided so as to overlap the reflective electrode 24, the optical sensor 9 does not cause a decrease in the transmissivity in the transmissive region. Therefore, it is possible to restrain deterioration of the display quality.

In addition, as illustrated in FIG. 2, TFTs 28 are each provided so as to overlap the reflective electrode 24 when seen from a normal direction of the display surface. Here, a gate terminal of each TFT 28 is connected to the scanning line Gi; a source terminal of each TFT 28 is connected to the data line Sj; and a drain terminal of each TFT 28 is connected to the transparent electrode 23 and the reflective electrode 24. Each scanning line Gi is connected to the gate driver 5, and each data line Sj is connected to the source driver 6.

The optical sensor 9 is for detecting a light intensity (or the illuminance) of the incident light into the liquid crystal display panel 4 and transmitting a detection result to the control section 8. Note that the number and a position of the optical sensor 9 to be provided are not particularly limited, and may be any number and any position as long as it is possible to appropriately detect the light intensity of the incident light into the liquid crystal display panel 4. For example, the optical sensor 9 may be provided to: (i) each of the picture elements of the liquid crystal display panel 4; (ii) any one of the picture elements R, G, and B of each pixel; or (iii) only a predetermined number of pixels or picture elements in a display screen. Moreover, a structure of the optical sensor 9 is not particularly limited either, as long as it is possible for the optical sensor 9 to appropriately detect the light intensity of the incident light into the liquid crystal display panel 4. As such, a conventionally well-known optical sensor can be used.

The temperature sensor 7 is for detecting an in-device temperature of the liquid crystal display device 1 and transmitting a detection result to the control section 8. FIG. 2 is an explanatory drawing for illustrating a mounting position of the temperature sensor 7. As shown in FIG. 2, a backlight unit 11 is provided on a backside of the liquid crystal display panel 4 (on a side opposite to an image display direction). Furthermore, on a backside of the backlight unit 11, a control substrate 12 is provided. This control substrate 12 includes the control section 8 and the like. The temperature sensor 7 is provided on the control substrate 12. In consideration of an intended purpose of the temperature sensor 7, the temperature sensor 7 is preferably provided in the liquid crystal display panel 4. However, because it is difficult to provide the temperature sensor 7 in the liquid crystal display panel 4 in reality, the temperature sensor 7 is provided in another member. The temperature sensor 7 is not necessarily provided on the control substrate 12, but may be provided on another substrate, member, or the like. Moreover, the temperature sensor 7 is preferably provided at a position away from heat generating members such as an inverter transformer and a power-supply unit (both of which are not illustrated), so as to be hardly affected by heat generating operations of these members.

Figures 4, 5:
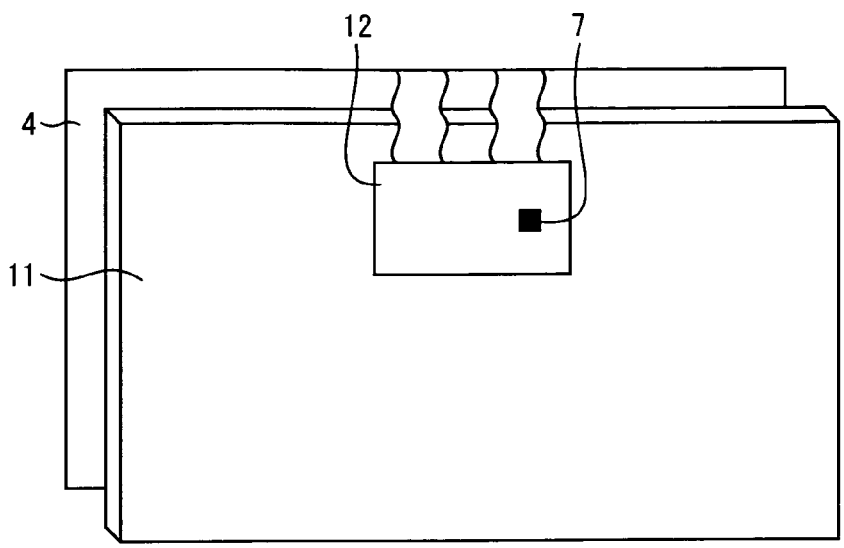
FIG. 4 is an explanatory diagram showing a mounting position of a temperature sensor provided in the liquid crystal display device of FIG. 1.
FIG. 5 is an explanatory diagram showing relations between respective OS table memories included in the liquid crystal display device of FIG. 1 and temperature ranges of the liquid crystal display panel.

The OS table memories 1*a* to 1*d* are memories each of which storing an emphasis conversion parameter corresponding to a combination of image data of a current frame and image data of a frame immediately preceding the current frame. As illustrated in FIG. 5, the OS table memories 1*a* to 1*d* respectively stores emphasis conversion parameters each corresponding to a different temperature range (a temperature range of the liquid crystal display panel 4 calculated by the control section 8). In the present embodiment, four kinds of OS table memories 1*a* to 1*d* respectively corresponding to four levels of temperature ranges are provided. However, the OS table memories are not limited thereto, and it is also possible to provide OS table memories respectively corresponding to three or less or five or more temperature ranges. Furthermore, OS table memories 1*a* to 1*d* do not always have to store emphasis parameters corresponding to all the combinations of the image data of the current frame and the image data of the frame immediately preceding the current frame. In a case where an emphasis conversion parameter corresponding to image data of a current frame and image data of a frame immediately preceding the current frame is not stored in any of the OS table memories 1*a* to 1*d*, an emphasis conversion parameter may be calculated through an interpolating calculation. The interpolating calculation may be performed with use of any of a variety of well-known conventional methods.

The control section 8 calculates the temperature of the liquid crystal display panel 4 based on the light intensity of the incident light into the liquid crystal display 4 detected by the optical sensor 9 and the in-device temperature detected by the temperature sensor 7. The control section 8 then outputs, to the emphasis conversion section 2, a switching selection signal which indicates an OS table memory corresponding to the calculated temperature of the liquid crystal display panel 4. A configuration of the control section 8 and details of processes that is performed in the control section 8 will be described later.

The emphasis conversion section 2 includes a frame memory (not illustrated) that stores image data of a frame immediately preceding a current frame. The emphasis conversion section 2 reads out, from the OS table memory corresponding to the switching selection signal inputted from the control section 8, an emphasis conversion parameter corresponding to a combination of input image data of the current frame inputted via an input terminal IN and the image data of the frame immediately preceding the current frame read out from the frame memory. Then, based on the parameter, the emphasis conversion section 2 performs an emphasis conversion process on the input image data of the current frame, and outputs thus processed data to the liquid crystal controller 3.

In the present embodiment, the emphasis conversion section 2 performs the emphasis conversion process with use of the emphasis conversion parameter corresponding to the combination of the input image data of the current frame and the image data of the frame immediately preceding the current frame. However, the present invention is not limited thereto. For example, the emphasis conversion section 2 may perform an emphasis conversion process with use of an emphasis conversion parameter corresponding to a combination of input image data of a current frame and image data corresponding to a gray scale (an image) assumed to be actually displayed at each pixel in a frame immediately preceding the current frame. In this case, for example, the emphasis conversion section 2 may include a display data assuming section (not illustrated) that assumes image data which corresponds to a gray scale assumed to be actually displayed at each pixel in the frame immediately preceding the current frame. This assumption is made based on: (i) a combination of input image data of a last frame immediately preceding a current frame and input image data of a frame immediately preceding the last frame; (ii) a combination of an image signal supplied to each pixel in the frame immediately preceding the current frame and the input image data of the frame immediately preceding the last frame; or (iii) a combination of the image signal supplied to each pixel in the last frame immediately preceding the current frame and an image signal supplied to each pixel in the frame immediately preceding the last frame. The image data thus assumed by the display data assuming section may then be stored in the frame memory.

The frame memory may be built in the emphasis conversion section 2. Alternatively, the frame memory may be provided separately from the emphasis conversion section 2.

The liquid crystal controller 3 generates, based on the image data inputted from the emphasis conversion section 2, signals such as a start pulse signal, a clock signal, a display data signal, and a latch pulse signal, and outputs these signals to the source driver 6. The liquid crystal controller 3 also generates signals such as a timing signal, a start pulse, and a clock signal, and outputs these signals to the gate driver 5. The source driver 6 supplies, at a timing in accordance with the start pulse signal or the clock signal, each data line Sj with a potential corresponding to display data inputted from the liquid crystal controller 3. The gate driver 5 supplies, at a timing in accordance with the signal inputted from the liquid crystal controller 3, each scanning line Gi with a potential that causes the TFTs 28 to be conductive. As such, an image corresponding to the input image data is displayed on the liquid crystal display panel 4.

Figure 6:
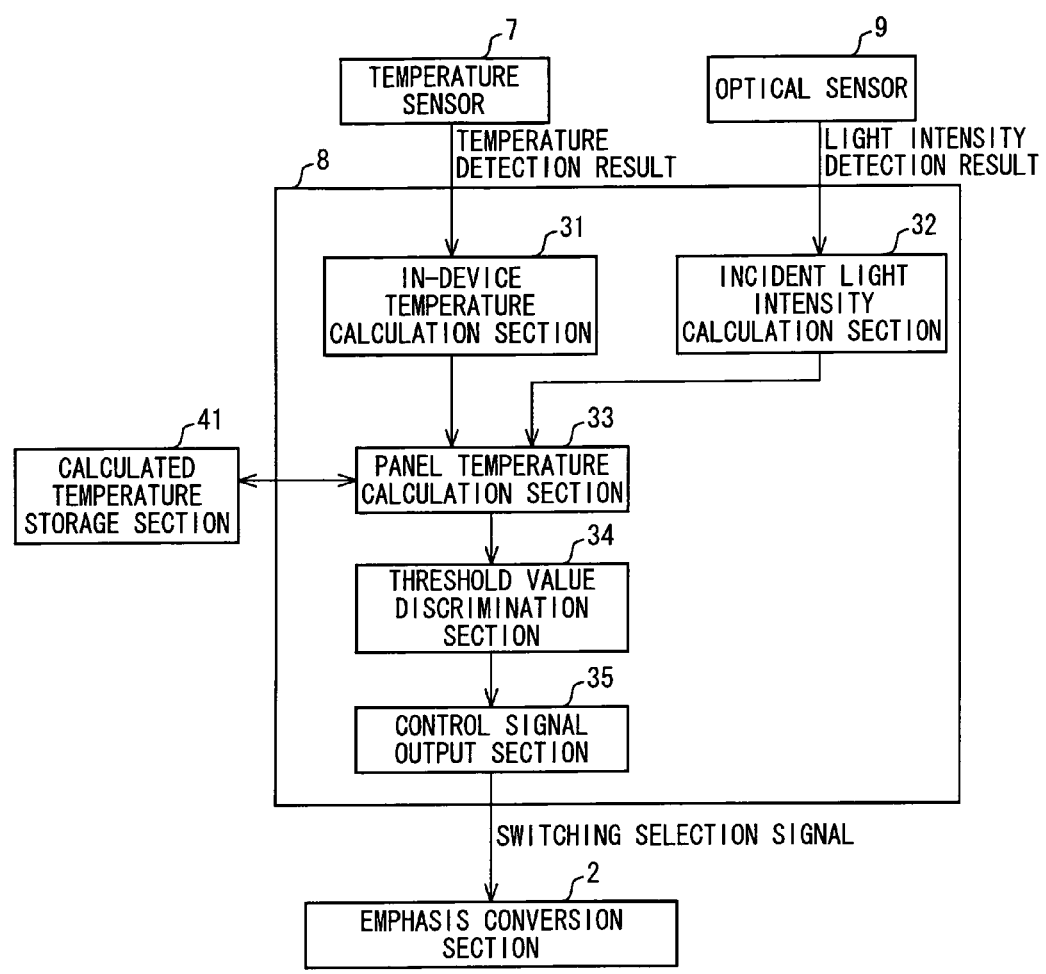
FIG. 6 is an explanatory diagram showing a configuration of a control section included in the liquid crystal display device of FIG. 1.
Figure 7:
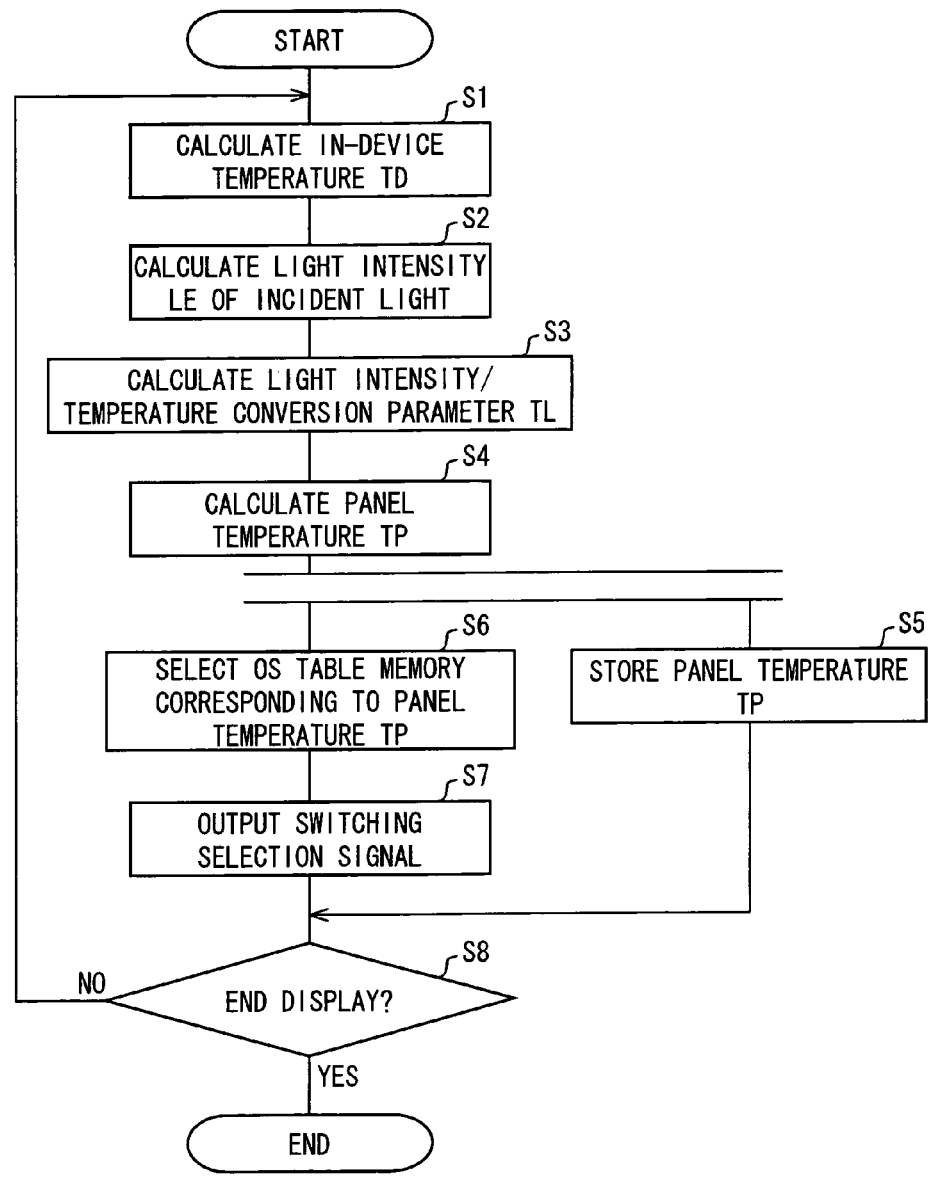
FIG. 7 is a flow diagram showing a process flow in the control section of FIG. 6.

The following describes the configuration of the control section 8 and processes in the control section 8. FIG. 6 is a block diagram illustrating the configuration of the control section 8. FIG. 7 is a block diagram showing a process flow in the control section 8.

As shown in FIG. 6, the control section 8 includes an in-device temperature calculation section 31, an incident light intensity calculation section 32, a panel temperature calculation section 33, a threshold value discrimination section 34, and a control signal output section 35. The liquid crystal display device 1 further includes a calculated temperature storage section 41 that stores a temperature (surface temperature) of the liquid crystal display panel 4 calculated by the panel temperature calculation section 33.

When image display is to be started on the liquid crystal display panel 4, first, the in-device temperature calculation section 31 calculates an in-device temperature TD of the liquid crystal display device 1 based on the detection result of the temperature sensor 7 (S1). In the present embodiment, the temperature sensor 7 samples an in-device temperature of the liquid crystal display device 1 in each predetermined period (for example, every tens of frames), and inputs, into the in-device temperature calculation section 31, a signal which corresponds to a result of the sampling. Every predetermined number of times the signal is inputted from the temperature sensor 7 (i.e., for every predetermined period), the in-device temperature calculation section 31 calculates an average value of inputted signals. The average value is regarded as the in-device temperature of the liquid crystal display device 1.

After the step S1, or in parallel with the step S1, the incident light intensity calculation section 32 calculates a light intensity LE of the incident light into the liquid crystal display panel 4 (S2). In the present embodiment, the optical sensor 9 samples the light intensity of the incident light into the liquid crystal display panel 4 for every predetermined period (for example, every tens of frames), and inputs a signal corresponding to a result of the sampling into the incident light intensity calculation section 32. Every predetermined number of times the signal is inputted from the optical sensor 9 (i.e., for every predetermined period), the incident light intensity calculation section 32 calculates an average value of the inputted signals. Then, based on the average value and the aforementioned predetermined period, the incident light intensity calculation section 32 calculates the light intensity LE of the incident light into the liquid crystal panel 4 in the predetermined period. Alternatively, the incident light intensity calculation section 32 may be configured, by specifying in advance a relation between a detection value of the optical sensor 9 and the light intensity LE of the incident light into the entire liquid crystal panel 4 through an experiment or the like, to calculate the light intensity LE of the incident light into the entire liquid crystal display panel 4 based on the relation.

As a next step, the panel temperature calculation section 33 calculates a light intensity/temperature conversion parameter TL corresponding to an amount of change in the temperature of the liquid crystal display panel 4 from the temperature of the liquid crystal display panel 4 that is calculated last (S3). The light intensity/temperature conversion parameter TL in the step S3 is calculated based on: (a) a result of the calculation of the in-device temperature TD calculated by the in-device temperature calculation section 31; (b) a result of the calculation of the light intensity LE of the incident light into the liquid crystal panel 4 calculated by the incident light intensity calculation section 32; and (c) a last calculation result of a temperature TP of the liquid crystal display panel 4 stored in the calculated temperature storage section 41. Note that, for initial calculation of the light intensity/temperature conversion parameter TL, the temperature TP of the liquid crystal display panel 4 calculated last may be used, as the in-device temperature TD of the liquid crystal display device 1, in a process of the calculation.

To be specific, the panel temperature calculation section 33 is configured in advance to have an operation expression for calculating the actual temperature TD of the liquid crystal display panel 4 based on a combination of: (a) the in-device temperature TD calculated by the in-device temperature calculation section 31; (b) the light intensity LE of the incident light after the last calculation of the temperature TP of the liquid crystal display panel 4; and (c) the temperature TP of the liquid crystal display panel 4 calculated last. The temperature TD of the liquid crystal display panel 4 is calculated based on the aforesaid operation expression.

In other words, the amount of change in the temperature of the liquid crystal display panel 4 depends on an amount of heat dissipation from the liquid crystal display panel 4 to the outside and an amount of increase in the temperature of the liquid crystal display panel 4 due to the incident light. As such, the panel temperature calculation section 33 calculates the amount of heat dissipation from the liquid crystal display panel 4 every predetermined period by using an operation expression or a lookup table in accordance with a result obtained by examining in advance a relation between (i) a difference between the in-device temperature and the temperature of the liquid crystal display panel 4 and (ii) the amount of heat dissipation from the liquid crystal display panel 4 in the aforementioned predetermined period. Further, the panel temperature calculation section 33 calculates, based on the light intensity LE of the incident light, an amount of heat input due to the incident light into the liquid crystal display panel 4 in the aforementioned predetermined period. The panel temperature calculation section 33 then adds the amount of heat dissipation and the amount of heat input so as to subsequently obtain a heat balance of the liquid crystal display panel 4 in the aforementioned predetermined period. Then, the panel temperature calculation section 33 finds out the amount of change in the temperature of the liquid crystal display panel 4 in the aforementioned predetermined period. The amount of change in the temperature thus calculated is regarded as the light intensity/temperature conversion parameter TL.

When a difference between the last calculated temperature TP of the liquid crystal display panel 4 (the temperature of the liquid crystal display panel 4 before the predetermined period) and the in-device temperature TD calculated by the in-device temperature calculation section 31 is relatively small and a value of the light intensity LE of the incident light is large, the amount of heat dissipation is small and the amount of heat input is large. This means that the temperature of the liquid crystal display panel 4 increases. Therefore, a value of the light intensity/temperature conversion parameter TL becomes positive. On the other hand, when the difference between the last calculated temperature TP of the liquid crystal display panel 4 and the in-device temperature TD calculated by the in-device temperature calculation section 31 is relatively large and the value of the light intensity LE of the incident light is small, the amount of heat dissipation is larger than the amount of heat input. This means that the temperature of the liquid crystal display panel 4 decreases. Therefore, the value of the light intensity/temperature conversion parameter TL becomes negative. When the difference between the last calculated temperature TP of the liquid crystal display panel 4 and the in-device temperature TD calculated by the in-device temperature calculation section 31 is zero and the value of the light intensity LE of the incident light is also zero, both the amount of heat dissipation and the amount of heat input are zero as well. Therefore, the value of the light intensity/temperature conversion parameter TL becomes zero.

As a next step, the panel temperature calculation section 33 calculates a temperature TP of the liquid crystal display panel 4, based on a result of a last detection result of the temperature TP of the liquid crystal display panel 4 and the light intensity/temperature conversion parameter TL calculated in the step S3 (S4). The panel temperature calculation section 33 stores a result of the calculation in the step S4 in the calculated temperature storage section 41 (S5) as well as outputs to the threshold value discrimination section 34.

The threshold value discrimination section 34 compares the temperature TP of the liquid crystal display panel 4 calculated by the panel temperature calculation section 33 with threshold values of the temperature ranges respectively corresponding to the OS table memories 1a to 1d, and selects an OS table memory corresponding to the temperature TP of the liquid crystal display panel 4 (S6). In other words, as shown in FIG. 5, when the temperature TP of the liquid crystal display panel 4 is less than 13° C., the threshold value discrimination section 34 selects the OS table memory 1a. When the temperature TP of the liquid crystal display 4 is equal to or more than 13° C. and less than 23° C., the threshold value discrimination section 34 selects the OS table memory 1b. When the temperature TP of the liquid crystal display 4 is equal to or more than 23° C. and less than 33° C., the threshold value discrimination section 34 selects the OS table memory 1c. When the temperature TP of the liquid crystal display 4 is less than 33° C., the threshold value discrimination section 34 selects the OS table memory 1d.

Subsequently, the control signal output section 35 outputs, to the emphasis conversion section 2, a, switching selection signal that indicates the OS table memory selected by the threshold value discrimination section 34.

As described above, in the liquid crystal display device 1 according to the present embodiment, the control section 8 calculates a temperature of the liquid crystal display panel 4, based on a detection result of the in-device temperature detected by the temperature sensor 7 and a detection result of the light intensity of the incident light into the liquid crystal display panel 4 detected by the optical sensor 9. Then, the control section 8 outputs a switching selection signal to the emphasis conversion section 2 so that an OS table memory is selected in accordance with a result of the calculation of the temperature of the liquid crystal display panel 4. The emphasis conversion section 2 then performs, with use of the OS table memory corresponding to the switching selection signal, an emphasis conversion process on image data of a current frame.

Thus, in the liquid crystal display device 1 according to the present embodiment, even when the temperature of the liquid crystal display panel 4 is changed by incident external light into the liquid crystal display panel 4, it is possible to perform the emphasis conversion process based on an actual temperature (or a temperature close to the actual temperature) of the liquid crystal display panel 4. This makes it possible to appropriately correct optical response characteristics of the liquid crystal display panel 4.

In the present embodiment, the incident light intensity calculation section 32 calculates an average value of signals, every predetermined number of times a signal from the optical sensor 9 is inputted. Then, based on thus calculated average value, the incident light intensity calculation section 32 calculates a light intensity LE of incident light into the liquid crystal display panel 4. However, the present invention is not limited thereto. For instance, it is possible to calculate, every predetermined number of times of inputs of a signal from the optical sensor 9, a total amount of the incident light in a period corresponding to the predetermined number of times, and then to calculate, based on the calculated total amount of the incident light, an amount of change in the temperature of the liquid crystal display panel 4 in the foregoing period.

In the present embodiment, each section (each block) making up the control section 8 of the liquid crystal display device 1 is realized by way of software, by using a processor such as a CPU or the like. That is, the liquid crystal display device 1 includes a CPU (central processing unit) that executes instructions in control programs realizing each function of the control section 8, a ROM (read only memory) which contains the programs, a RAM (random access memory) to which the programs are loaded, and a storage device (storage medium) such as a memory containing the programs and various data. The object of the present invention can also be achieved by mounting to the liquid crystal display device 1 a computer-readable storage medium containing a control program code (executable program, intermediate code program, or source program) for the liquid crystal display device 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

Furthermore, the liquid crystal display device 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal which is embedded in a carrier wave and in which the program code is embodied electronically.

Each block of the control section 8 is not limited to those realized by way of software, but may be made up by way of hardware. Alternatively, each block of the control section 8 may be realized by way of a combination of hardware that performs a part of processes and operation means that executes software for controlling the hardware and performing the residual processes.

In the present embodiment, a liquid crystal display device 1 provided in a cellular phone has been described. However, an intended application of the present invention is by no means limited thereto.

An effect of the present invention can be achieved particularly preferably in a liquid crystal display device used in an environment where a light intensity of incident light is high. For example, the present invention is particularly suitable for a liquid crystal display device provided in a portable electronic device such as a PHS (personal handyphone system (Registered Trademark)), PDA (personal digital assistants), and a laptop computer; a liquid crystal display device provided in various vehicles such as an automobile, a motorcycle, an airplane, a helicopter, a train, and a ship; and a liquid crystal display device set up, for example, outside or in stores for the purpose of displaying information, an advertisement, or the like.

The present embodiment mainly describes a case where the present invention is applied to a liquid crystal display device including a transmissive region and a reflective region. This is on the supposition that a liquid crystal display device including a transmissive region and a reflective region is used in an environment where a light intensity of incident external light is strong. Such a liquid crystal display device can particularly preferably enjoy benefit of the present invention. However, the intended application of the present invention is by no means limited thereto. The present invention may be applied to a liquid crystal display device including only one of a transmissive region and a reflecting region.

Figure 8:
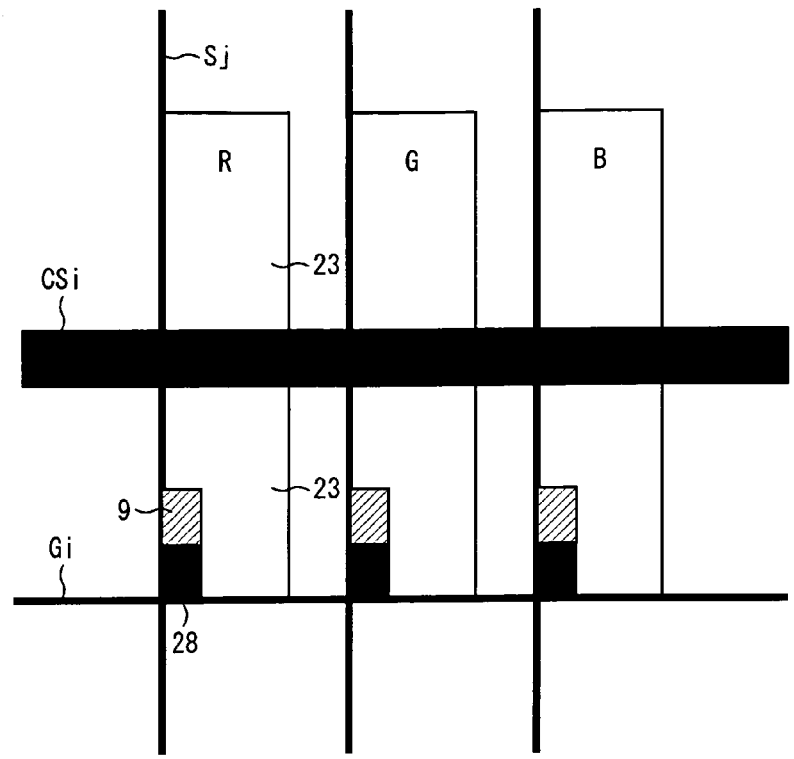
FIG. 8 is a plane view illustrating a pixel configuration according to a modified example of the liquid crystal display panel of FIG. 2.
Figure 9:
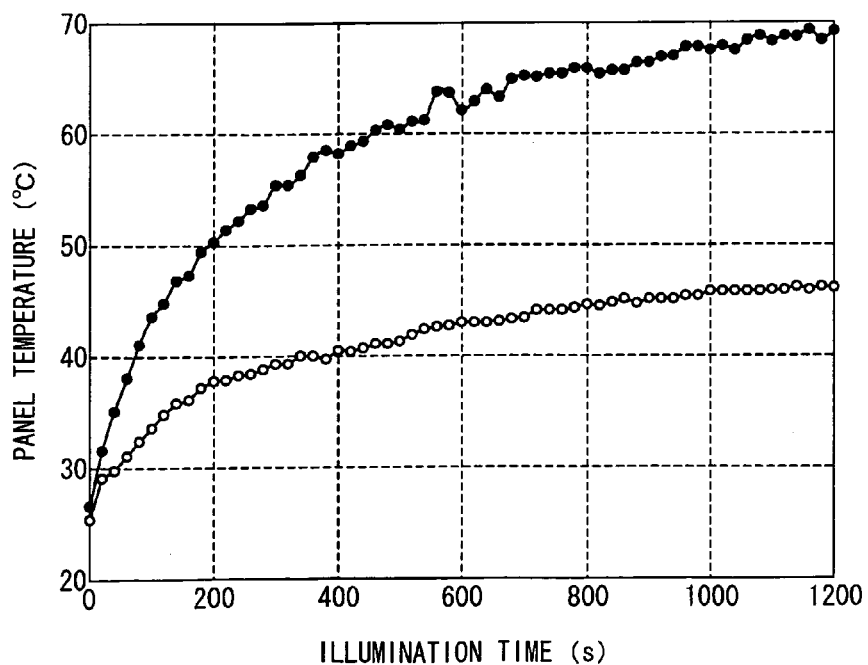
FIG. 9 is a graph showing a relation between time for illumination on a liquid crystal display panel and temperature of the liquid crystal display panel.

FIG. 8 is a plane view illustrating an example of a configuration of picture elements in a case where the present invention is applied to a liquid crystal display device including only a transmissive region. As illustrated in FIG. 8, even when the present invention is applied to a liquid crystal display device including only a transmissive region, an optical sensor 9 may be provided to a part of each picture element in a similar manner to the case where the liquid crystal display device includes both a transmissive region and a reflecting region. It should be noted that the optical sensor 9 may be provided so as to overlap a position of a corresponding wiring such as a scanning line Gi and a data line Sj, or a corresponding TFT 28 when seen from a normal direction of the display surface. This makes it possible to restrain a decrease in an aperture ratio due to addition of the optical sensors 9.

The present invention is not limited to the description of the embodiments above, but may be altered within the scope of the claims. An embodiment based on a proper combination of technical means disclosed in different embodiments is encompassed in the technical scope of the present invention.

Industrial Applicability

The present invention may be applied to a liquid crystal display device.

The invention claimed is:

1. A liquid crystal display device comprising:
    an emphasis conversion section configured to perform an emphasis conversion process on image data of a current frame, based on an emphasis conversion parameter corresponding to a combination of image data of the current frame and image data of a frame immediately preceding the current frame or image data corresponding to an image assumed to be actually displayed on a liquid crystal display panel in the frame immediately preceding the current frame;
    driving sections configured to cause the liquid crystal display panel to display an image corresponding to the image data on which the emphasis conversion process has been performed by the emphasis conversion section;
    a temperature detection section configured to detect an in-device temperature of the liquid crystal display device;
    a light intensity detection section configured to detect a light intensity of incident external light into the liquid crystal display panel;
    a panel temperature calculation section configured to calculate a temperature of the liquid crystal display panel, based on the in-device temperature detected by the temperature detection section and the light intensity of the incident external light detected by the light intensity detection section; and
    a control section configured to change the emphasis conversion parameter to be used in the emphasis conversion process in accordance with the temperature of the liquid crystal display panel calculated by the panel temperature calculation section.

2. A liquid crystal display device according to claim 1, further comprising:
    a plurality of look-up tables respectively corresponding to a plurality of temperature ranges of the liquid crystal display panel, each of the plurality of look-up tables configured to store the emphasis conversion parameter corresponding to the combination of the image data of the current frame and the image data of the frame immediately preceding the current frame or the image data corresponding to the image assumed to be actually displayed on the liquid crystal display panel in the frame immediately preceding the current frame,
    the control section configured to cause the emphasis conversion section to perform the emphasis conversion process, based on a look-up table from among the plurality of look-up tables, the look-up table corresponding to the temperature of the liquid crystal display panel calculated by the panel temperature calculation section.

3. The liquid crystal display device according to claim 1, wherein:
    the light intensity detection section is provided in the liquid crystal display panel.

4. The liquid crystal display device according to claim 1, wherein:
    the liquid crystal display panel is a liquid crystal display panel including pixels each including:
        a transmissive region configured to perform display by transmitting, through the pixel, light emitted from a backlight; and
        a reflective region configured to perform display by reflecting incident external light.

5. The liquid crystal display device according to claim 4, wherein:
    the light intensity detection section is provided so as to overlap the reflective region in the direction of a display surface.

6. The liquid crystal display device according to claim 1, wherein:
    the panel temperature calculation section configured to calculate the temperature of the liquid crystal display panel every predetermined period;
    the light intensity detection section configured to detect an average light intensity value or a total light amount value of incident light into the liquid crystal display panel in a period from a time point at which the panel temperature calculation section last calculates the temperature of the liquid crystal display panel to a present time;
    the panel temperature calculation section configured to caculate:
        an amount of heat input into the liquid crystal display panel due to the incident light in a period from a time point at which the panel temperature calculation section last calculates the temperature of the liquid crystal display panel to a present time, based on a detection result of the average light intensity value or the total light amount value;
        an amount of heat dissipation from the liquid crystal display panel to an outside in the period from the time point at which the panel temperature calculation section last calculates the temperature of the liquid crystal display panel to the present time, based on a detection result of the in-device temperature detected by the temperature detection section and a last calculation result of the temperature of the liquid crystal display panel; and a current temperature of the liquid crystal display panel based on the amount of heat input, the amount of heat dissipation, and the last detection result of the temperature of the liquid crystal display panel.

7. A method for controlling a liquid crystal display device, the liquid crystal display device performing an emphasis conversion process on image data of a current frame, based on an emphasis conversion parameter corresponding to a combination of image data of the current frame and image data of a frame immediately preceding the current frame or image data corresponding to an image assumed to be actually displayed on a liquid crystal display panel in the frame immediately preceding the current frame, and causing the liquid crystal display panel to display an image corresponding to the image data on which the emphasis conversion process has been performed, the method comprising the steps of:

detecting an in-device temperature of the liquid crystal display device;

detecting a light intensity of incident external light into the liquid crystal display panel;

calculating a temperature of the liquid crystal display panel, based on the in-device temperature detected in the step of detecting the in-device temperature and the light intensity of the incident external light detected in the step of detecting the light intensity; and changing the emphasis conversion parameter to be used in the emphasis conversion process, in accordance with the temperature of the liquid crystal display panel calculated in the step of calculating the temperature of the liquid crystal panel.

\* \* \* \* \*